United States Patent [19]

Sato

[11] Patent Number: 5,189,565
[45] Date of Patent: Feb. 23, 1993

[54] SLEW RATE CONVERTER FOR A VIDEO SIGNAL RECORDING APPARATUS

[75] Inventor: Ichitaro Sato, Kanagawa, Japan
[73] Assignee: Sony Corporation, Tokyo, Japan
[21] Appl. No.: 553,390
[22] Filed: Jul. 17, 1990
[30] Foreign Application Priority Data Jul. 21, 1989 [JP] Japan .................................. 1-189163

[51] Int. Cl.⁵ ........................ H04N 5/78; G11B 5/02
[52] U.S. Cl. .................................. 360/33.1; 360/67; 360/29; 358/315
[58] Field of Search .................. 360/33.1, 25, 27, 67, 360/29, 46, 65, 68; 358/335, 315, 318, 336, 340, 37, 36, 166, 330, 327

[56] References Cited

U.S. PATENT DOCUMENTS

| | | | |
|---|---|---|---|
| 4,018,990 | 4/1977 | Long et al. | 360/36.2 |
| 4,193,084 | 3/1980 | Yamagiwa et al. | 358/315 |
| 4,635,140 | 1/1987 | Uchimi | 360/40 |
| 4,654,607 | 3/1987 | Ishikawa | 360/29 |
| 4,689,779 | 8/1987 | Hayashi et al. | 369/44.32 |
| 4,704,642 | 11/1987 | Namiki | 360/67 |
| 4,706,236 | 11/1987 | Yoda | 360/67 |

Primary Examiner—Aristotelis Psitos
Assistant Examiner—Varsha V. Sheladia
Attorney, Agent, or Firm—Lewis H. Eslinger; Jay H. Maioli

[57] ABSTRACT

A slew rate converter is provided in a video signal recording circuit for limiting a signal having a high frequency and a high amplitude so as to avoid an overmodulation when the signal is reproduced. The high frequency and high amplitude component exceeding a pre-determined amplitude is detected and applied to the slew rate converter for reducing its slew rate so that the signal component having the high frequency and high amplitude is suppressed.

3 Claims, 5 Drawing Sheets

SLEW RATE CONVERTER FOR A VIDEO SIGNAL RECORDING APPARATUS

BACKGROUND OF THE INVENTION

1. Field of the Invention

The present invention relates generally to band limiting apparatus and more particularly to a slew rate converter for a video signal recording apparatus used in an input stage of, for example, a video tape recorder (VTR).

2. Description of the Prior Art

In a video signal recording apparatus such as a video tape recorder (VTR) and the like, a band limiting apparatus is used in order to remove an undesired high frequency component in the signal processing process.

FIG. 1 schematically shows an example of a video tape recorder that utilizes a low-pass filter (LPF) as such band limiting apparatus.

Referring to FIG. 1, a signal $V_1$ formed of a luminance signal, which is processed by a so-called Y/C separator circuit (not shown), is applied to an input terminal 1. This input signal $V_1$ is supplied to a low-pass filter (LPF) 2, in which the high frequencies are filtered out to provide an output signal $V_2$. The output signal $V_2$ from the low-pass filter 2 is supplied to a clamping circuit 3, in which it is clamped to keep a DC level of its sync. chip portion constant. A pre-emphasizing circuit 4 is provided in order to avoid a so-called triangular noise. An FM-modulator circuit 5 is provided to FM-modulate the output signal from the pre-emphasizing circuit 4. An FM-modulated output signal from the FM-modulator circuit 5 is amplified by a recording amplifier 6 and is recorded on a magnetic tape 8 by a recording head 7. An adding circuit for adding down-converted color difference signals and the like is not shown in FIG. 1.

Let it be assumed that fc represents the cut-off frequency of the low-pass filter 2 shown in FIG. 1. Then, as shown in FIG. 2, the frequency characteristic of the output signal $V_2$ is attenuated by the same attenuation factor whether the level at frequency $f_c$, say, is $V_A$ or $V_B$.

However, in the region (i.e., the hatched portion 9 in FIG. 2) wherein the signal level of the output signal $V_2$ is high and the frequency thereof is high, there is the substantial disadvantage that the deterioration of image quality such as so-called picture drop-out, an inversion of video image or the like occurs in the picture reproduced from the magnetic tape 8 due to the modulation characteristic of the FM-modulator circuit 5, the recording characteristic of the magnetic tape 8 and the like. This phenomenon is similar to a so-called over-modulation in the AM-modulator circuit and is therefore generally referred to as an over-modulation.

To avoid this over-modulation, as shown in FIG. 2, it is enough to lower the cut-off frequency fc of the low-pass filter 2. This proposal, however, removes a relatively high frequency component whose signal level is under about an intermediate level, resulting in the high frequency component of the reproduced picture being lost More specifically, in the case of, for example, the video tape recorder, if a video signal maintains a flat characteristic up to a luminance signal corresponding to 100 IRE and can suddenly attenuate the frequency characteristic of the luminance signal in a range of from 100 IRE to 120 IRE, then it can be expected that an excellent image quality is provided.

OBJECTS AND SUMMARY OF THE INVENTION

Accordingly, it is a general object of the present invention to provide an improved slew rate converter which can eliminate the shortcomings and disadvantages encountered with the prior art.

More specifically, it is an object of the present invention to provide a slew rate converter which can remove only a relatively high frequency component in which a signal level exceeds a pre-determined value and the occurrence of an over-modulation can be prevented.

It is another object of the present invention to provide a slew rate converter which is suitable for application to an input stage of a video signal recording apparatus such as a video tape recorder and the like.

According to an aspect of the present invention, an apparatus for recording a video signal on a video tape comprises a slew rate converter having an input terminal for receiving a video signal and an output terminal for supplying the video signal to a record circuit, a detecting circuit for detecting a signal component having a high frequency and a high amplitude exceeding a pre-determined amplitude included in the video signal, and a circuit responsive to the signal component for controlling a slew rate of the slew rate converter so as to suppress the signal component of the video signal supplied to the output terminal of the slew rate converter.

The above, and other objects, features and advantages of the present invention, will be apparent in the following detailed description of the preferred embodiment when read in co junction with the accompanying drawings, in which like reference numerals are used to identify the same or similar parts in the several views.

DETAILED DESCRIPTION OF THE PREFERRED EMBODIMENT

An embodiment of a slew rate converter according to the present invention will hereinafter be described in detail with reference to FIGS. 3 to 8. In this embodiment, the band limiting apparatus of the invention is realized in the form of a slew rate converter circuit which can change the slew rate of the output signal.

Figure 1:
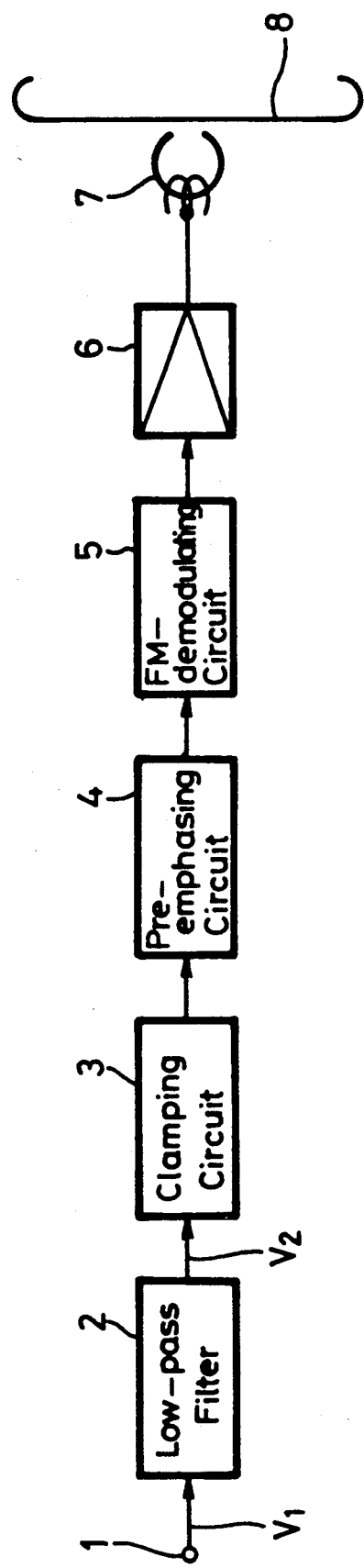
FIG. 1 is a circuit block diagram showing a main portion of a recording section of a prior-art video tape recorder, and to which reference will be made in explaining the defects of the prior art.
Figure 2:
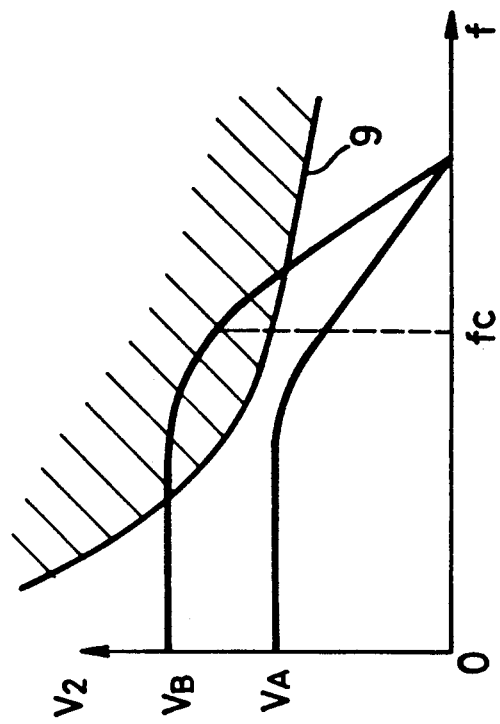
FIG. 2 is a schematic representation useful in understanding an operation of the video tape recorder shown in FIG. 1.

The slew rate converting circuit of this embodiment can be incorporated in the input stage of the video tape recorder instead of the low-pass filter 2 shown in FIG. 1.

Figure 3:
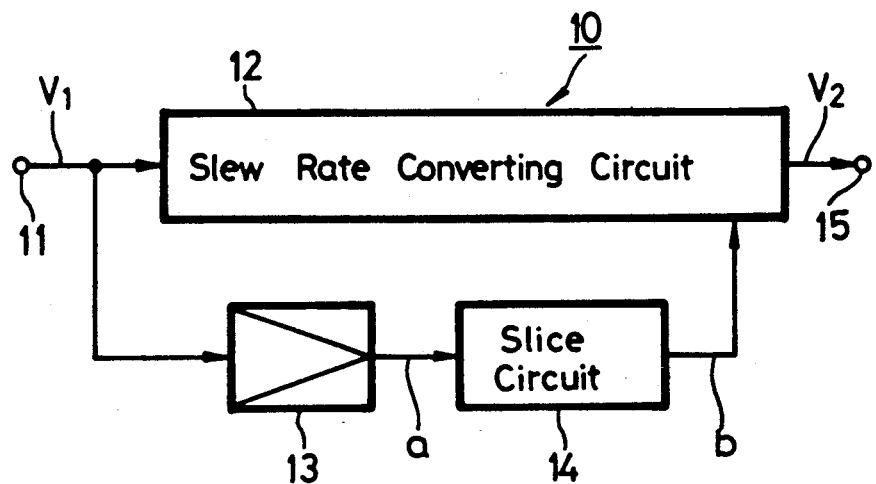
FIG. 3 is a circuit block diagram showing an embodiment of a slew rate converter according to the present invention.

FIG. 3 shows an overall arrangement of a slew rate converting circuit 10 of this embodiment.

Figure 4A:
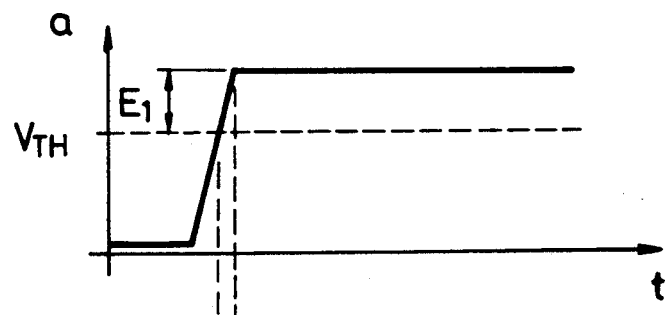
FIGS. 4A to 4C, FIGS. 5A and 5B, FIGS. 6A and 6B and FIG. 7 are respective schematic representations used to explain the operation of the slew rate converter of the present invention shown in FIG. 3.
Figure 4B:
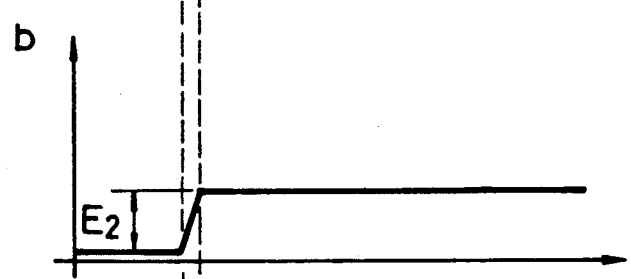

Referring to FIG. 3, there is shown an input terminal 11 to which an input signal $V_1$ formed of, for example, a luminance signal is applied. In FIG. 3, reference numeral 12 depicts a slew rate converting circuit and 13 an amplifying circuit. The input signal $V_1$ applied to the input terminal 11 is supplied to input terminals of the slew rate converting circuit 12 and the amplifying circuit 13. An output signal a of the amplifying circuit 13 is supplied to a slice circuit 14. If the level of the output signal a of the amplifying circuit 13 exceeds a predetermined threshold value $V_{TH}$, the slice circuit 14 slices away a level $E_1$ of the portion higher than the pre-determined threshold level $V_{TH}$ to make a slice signal b of level $E_2$ and supplies the same to a control terminal of the slew rate converting circuit 12 as shown in FIGS. 4A and 4B.

Figure 4C:
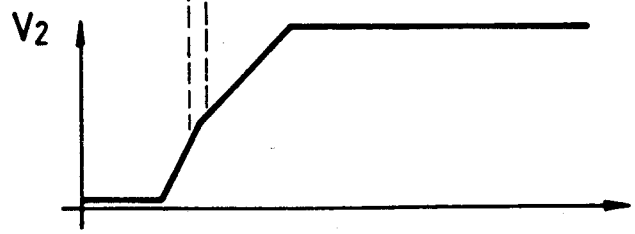

The slew rate converting circuit 12 converts the input signal $V_1$ into the output signal $V_2$ having a pre-determined slew rate at a pre-determined gain if the slice signal b is at zero level. On the other hand, if the slice signal b becomes higher than zero level, the slew rate converting circuit 12 decreases the slew rate of the output signal $V_2$ in response to the increase of the level of the slice signal b. The output signal $V_2$ of the slew rate converting circuit 12 is fed to an output terminal 15. Accordingly, as shown in FIG. 4C, the slew rate of the output signal $V_2$ is changed near the leading edge of the slice signal b.

Figure 5A:
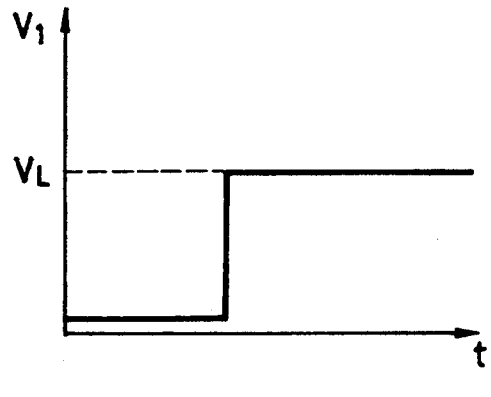
Figure 5B:
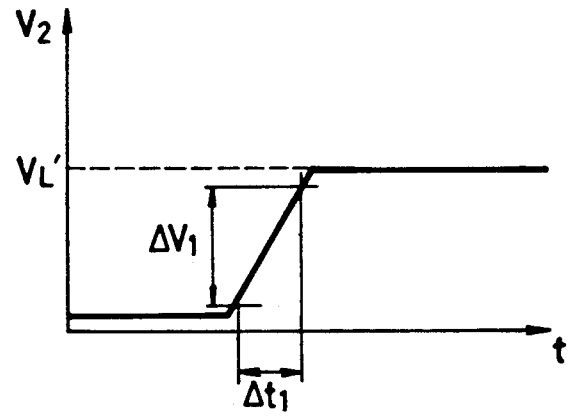

$V_2$ assumes the signal level of the input signal $V_1$ provided when the output signal a of the amplifying circuit 13 coincides with the threshold value $V_{TH}$. If the signal level of the input signal $V_1$ rapidly increases from zero to $V_L$ ($V_L \leq V_{th}$) as shown in FIG. 5A, the output signal $V_2$ increases to the level $V_L$, with an inclination of $\Delta V_1/\Delta t_1$ as shown in FIG. 5B. In that case, a slew rate $SR_L$ is expressed as $$SR_L = \Delta V_1/\Delta t_1$$

Figure 6A:
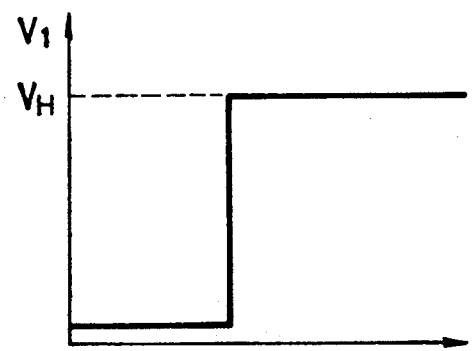
Figure 6B:
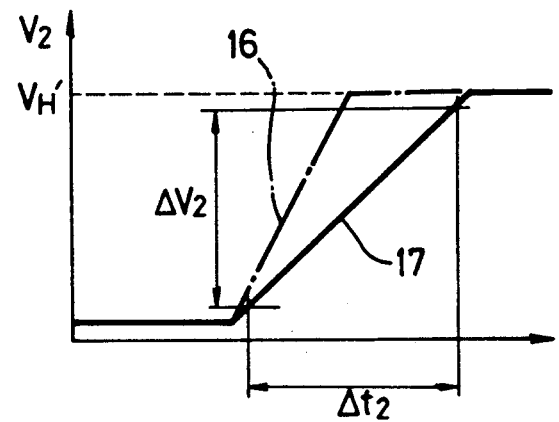

Further, if the signal level of the input signal $V_1$ rapidly increases from zero to $V_H$ ($V_H > V_{th}$) as shown in FIG. 6A, then the output signal $V_2$ increases to the level $V_H$, with an inclination of substantially $\Delta V_2/\Delta t_2$ as shown in FIG. 6B. Assuming that the slice circuit 14 is not provided, then the output signal $V_2$ changes with the same characteristic 16 as the inclination shown in FIG. 5B. In accordance with this embodiment, the output signal $V_2$ changes with a characteristic 17 shown in FIG. 6B due to the action of the slice circuit 14. The slew rate $SR_H$ in FIGS. 6A and 6B is given as $$SR_H = \Delta V_2/\Delta t_2$$

Thus, an inequality, $SR_L > SR_H$ is established.

As described above, according to the embodiment shown in FIG. 3, if the signal level of the input signal $V_1$ exceeds the pre-determined level $V_{th}$, the slew rate is decreased so that, when the level of the input signal $V_1$ exceeds the level $V_{th}$, it is expected that the frequency characteristic will be rapidly attenuated. In order to clarify this expectation by theory, let us consider a relationship between the slew rate SR and a unity gain frequency fu of a standard amplifier.

Assuming that Cx represents a capacitance value of a coupling capacitor in the amplifier, gm represents a mutual conductance relative to the input signal $V_1$, $i_1$ represents a current flowing to the coupling capacitor and that $V_2$ represents the output signal, then the values of the aforenoted elements approximately satisfy the following relationship:

$$i_1 = gm V_1 = Cx (dV_2/dt) \qquad (1)$$

Further, f assumes the frequency of the input signal $V_1$. Then, the equation (1) can be modified as $$gm V_1 = j2\pi f Cx V_2 \qquad (2)$$

Accordingly, since $|V_2/V_1| = gm/(2\pi fu\ Cx) = 1$, the unity gain frequency fu is expressed as $$fu = gm/(2\pi Cx) \qquad (3)$$

Furthermore, the equation (1) yields the slew rate SR of the amplifier as $$SR = |dV_2/dt|\max = gm\ V_1/Cx \qquad (4)$$

Therefore, it is to be understood from the equations (3) and (4) that, if the slew rate SR is decreased, the unity gain frequency fu is also decreased.

Figure 7:
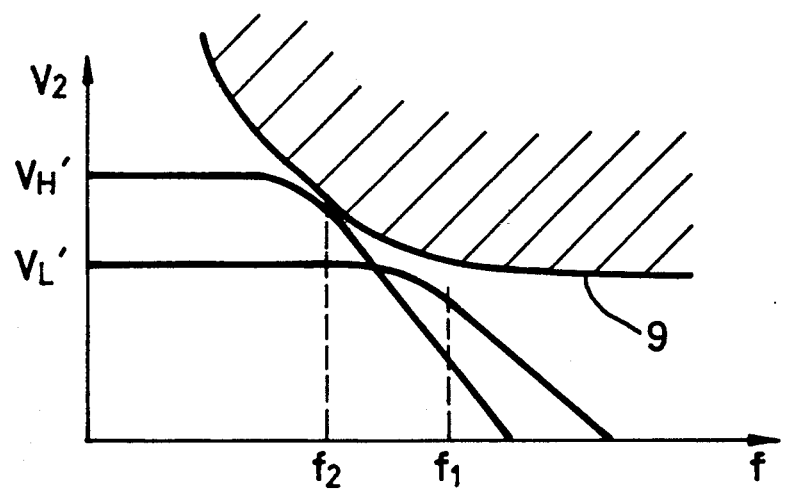

This means that, when the frequency characteristic of the output signal $V_2$ in the embodiment of FIG. 3 is such that the signal level in which the frequency f is zero increases from $V_L$, to $V_H$, the cut-off frequency is decreased from $f_1$ to $f_2(f_2 < f_1)$ as shown in FIG. 7. Therefore, by adjusting the values of the cut-off frequencies $f_1$, $f_2$ and the like, it is possible to prevent the frequency characteristic of the output signal $V_2$ from overlapping the hatched region 9 in which the over-modulation occurs. For this reason, according to this embodiment, a relatively high frequency component in which the signal level is below $V_{th}$ is not removed but only a relatively high frequency component in which the signal level is above $V_{th}$ can be removed. Therefore, maintaining the resolution of the video image, the occurrence of the over-modulation can be avoided.

Figure 8:
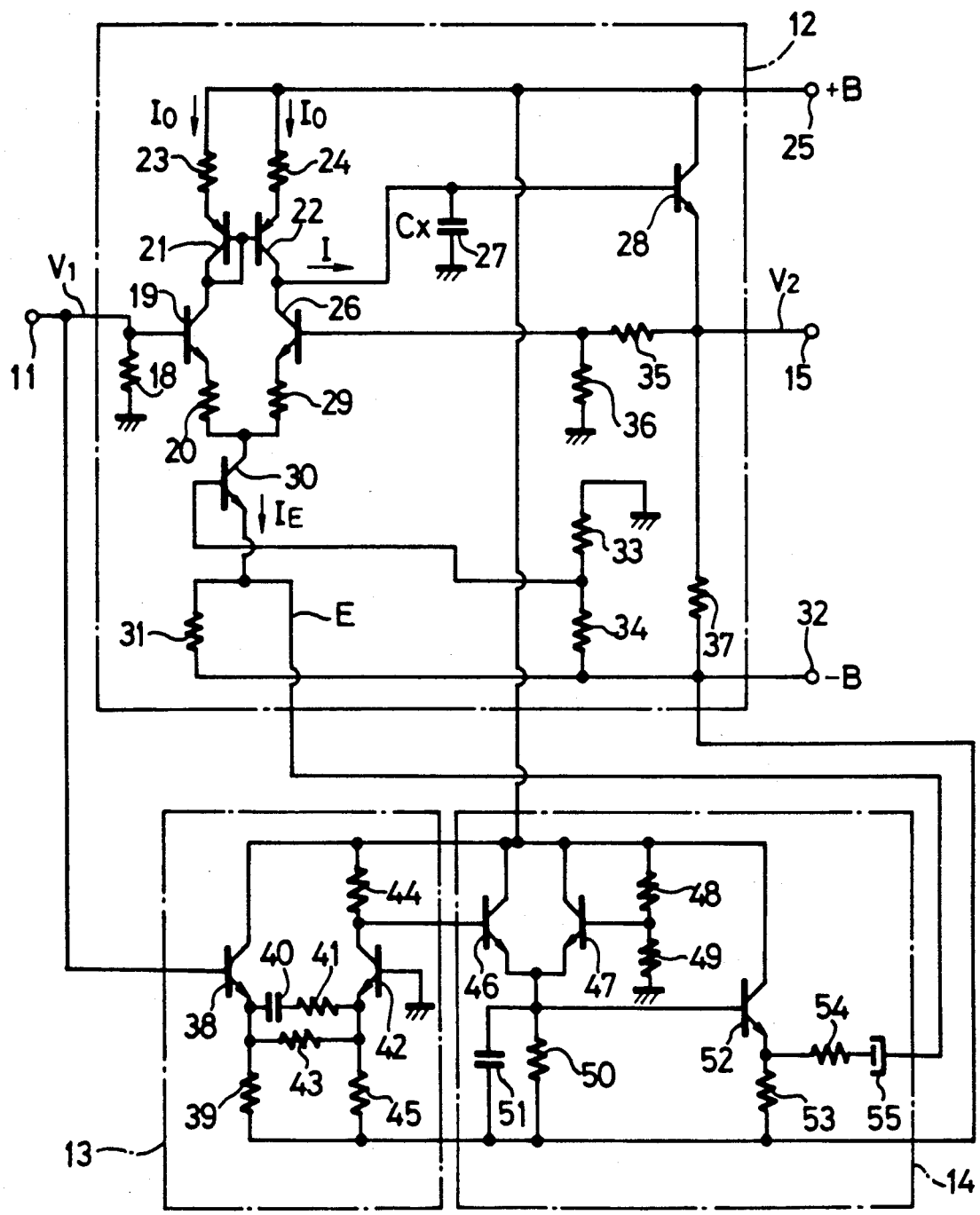
FIG. 8 is a schematic diagram showing in actual practice an example of a circuit arrangement of the slew rate converter shown in FIG. 3.

The example of the circuit arrangement shown in FIG. 3 in actual practice will be described next with reference to FIG. 8. In FIG. 8, like parts corresponding to those of FIG. 3 are marked with the same references and therefore need not be described in detail.

As FIG. 8 shows, the input signal $V_1$ applied to the input terminal 11 is supplied to one end of a resistor 18 and to the base of an npn transistor 19, the other end of the resistor 18 is grounded and the emitter of the transistor 19 is connected to one end of a resistor 20. The collector of the transistor 19 is commonly connected to the collector and base of a pnp transistor 21 and to the base of a pnp transistor 22. The emitter of the transistor 21 and the emitter of the transistor 22 are respectively connected through resistors 23 and 24 to a power supply terminal 25 to which a positive voltage $+B$ is applied.

The collector of the transistor 22 is commonly connected to the collector of an npn transistor 26, one end of a capacitor 27 having a capacitance value Cx and to the base of an npn transistor 28. The other end of the capacitor 27 is grounded and the collector of the transistor 28 is connected to the power supply source terminal 25. The emitter of the transistor 26 is connected to one end of the resistor 29, and the other end of the resistor 20 and the other end of the resistor 29 are commonly connected to the collector of an npn transistor 30 whose emitter is connected via a resistor 31 to a power supply source terminal 32 to which a negative voltage −B is applied. The power supply source terminal 32 is grounded via resistors 34 and 33, and a junction between the resistors 34 and 33 is connected to the base of the transistor 30. The base of the transistor 26 is coupled to one end of a resistor 35 and to one end of a resistor 36. The other end of the resistor 36 is grounded and the other end of the resistor 35 and the emitter of an npn transistor 38 are commonly coupled to the output terminal 15. A resistor 37 is interposed between the output terminal 15 and the power supply source terminal 32.

In the amplifying circuit 13, the input signal $V_1$ is applied to the base of the npn transistor 38, and the emitter of the transistor 38 is connected through a capacitor 40 and a resistor 41 to the emitter of an npn transistor 42. The emitters of the transistors 38 and 42 are further connected together via a resistor 43, and the base of the transistor 42 is grounded. The collector of the transistor 38 is directly coupled to the power supply source terminal 25, and the collector of the transistor 42 is coupled through a resistor 44 to the power supply source terminal 25. The emitters of the transistors 38 and 42 are connected together to the power supply source terminal 32 via the resistors 39 and 45.

An amplified signal developed at the collector of the transistor 42 is supplied to the base of an npn transistor 46, and the emitter of the transistor 46 is connected to the emitter of an npn transistor 47. The commonly connected emitters of the transistors 46 and 47 are connected to the power supply source terminal 32 via a parallel connected circuit of a resistor 50 and a capacitor 51. The collectors of the transistors 46 and 47 are both coupled to the power supply source terminal 25 which is grounded via resistors 48 and 49. A junction between the resistors 48 and 49 is connected to the base of the transistor 47. The commonly connected emitters of the transistors 46 and 47 are connected to the base of an npn transistor 52 whose collector is connected to the power supply source terminal 25. The emitter of the transistor 52 is connected to the power supply source terminal 32 via a resistor 53. A signal developed at the emitter of the transistor 52 is coupled to the emitter of the transistor 30 in the slew rate converting circuit 12 via a resistor 54 and a capacitor 55 which is used to interrupt a DC current.

An operation of the circuit arrangement shown in FIG. 8 will be described.

In the slew rate converting circuit 12, a bias current Ir corresponding to the signal level of the input signal $V_1$ flows through the transistor 30, a current $I_O$ flows through the transistors 21 and 22 owing to the current mirror effect and a charging current flows to the capacitor 27. The charging current I continues to flow until a voltage divided signal, which results from dividing the output signal $V_2$ at the output terminal 15 by the resistors 35 and 36, substantially coincides with the input signal $V_1$.

In that case, since $I_O + (I_O − I) = I_E$, this yields $$I = 2I_O − I_E \quad (5)$$

Since $0 \leq I_O \leq I_E$ is established, the equation (5) yields $$-I_E \leq I \leq I_E \quad (6)$$

In this embodiment, the capacitor 27 corresponds to the coupling capacitor so that the maximum value of the slew rate in this embodiment can be expressed, in response to the equation (4), as follows.

$$SR = I_E/Cx \quad (7)$$

In this embodiment, the slew rate SR is changed by varying the bias current $I_E$ in the equation (7).

In order to vary the bias current $I_E$, it is necessary to change the level E of the signal which is supplied from the slice circuit 14 to the emitter of the transistor 30. More specifically, the input signal $V_1$ is amplified by the amplifying circuit 13. If the level of the thus amplified signal is smaller than that of the voltage supplied to the base of the transistor 47, then a constant voltage is supplied to the base of the transistor 52. If the level of the thus amplified signal is larger than the voltage supplied to the base of the transistor 47, then the voltage supplied to the base of the transistor 52 is increased by the level substantially proportional to the level corresponding to the difference therebetween, resulting finally in the signal level E (AC component) supplied to the emitter of the transistor 30 being increased. Therefore, the bias current $I_E$ that flows through the transistor 30 is decreased, whereby the slew rate SR in the slew rate converting circuit 12 can be decreased on the basis of the equation (7).

As set out above, according to the embodiment shown in FIG. 8, the slew rate SR can be varied by controlling the charging current I to the coupling capacitor 27. The method of varying the slew rate SR is not limited thereto and the slew rate SR may be varied by controlling directly the capacitance value Cx of the coupling capacitor 27.

Figure 9:
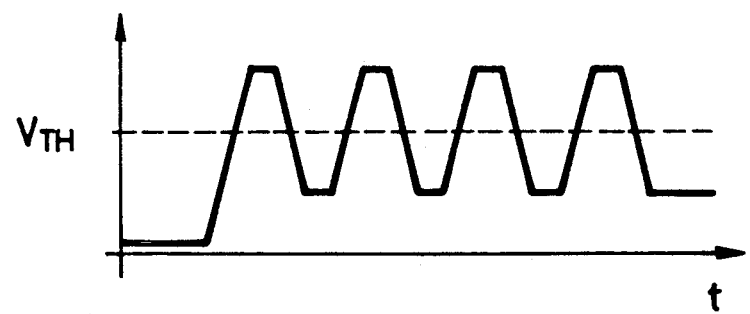
FIGS. 9 and 10 are respective schematic representations used to explain an operation of the circuit shown in FIG. 8.
Figure 10:
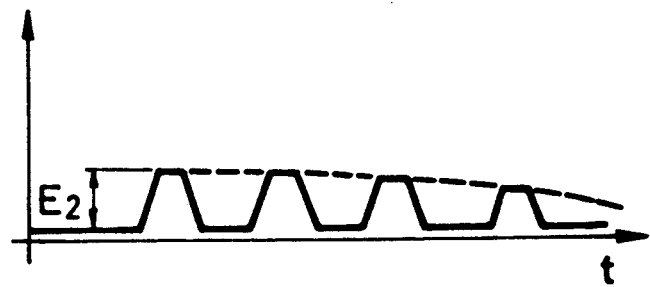

Further, by properly selecting the resistance value of the resistor 50 and the capacitance of the capacitor 51 in the slice circuit 14 shown in FIG. 8, it is possible to process an input signal shown in FIG. 9. More specifically, if a picture of portrait is taken in such a background that sunlight shines into a room through a blind in the window, then the level of the external light shining into the room through the blind is high so that the signal waveform becomes as shown in FIG. 9. In such case, the so-called over-modulation will occur very frequently, deteriorating the image quality of the reproduced picture considerably. In order to avoid the over-modulation, the resistance value of the resistor 50 and the capacitance value of the capacitor 51 must be selected properly. If so, it is possible to obtain a slew rate control signal shown by a dashed line shown in FIG. 10. According to this slew rate control signal shown in FIG. 10, although the high band component is deteriorated by a very small amount in the blind portion, the overmodulation characteristic of the prior art, which becomes very conspicuous on the picture screen, can be avoided.

As set forth above, according to the present invention, the relatively high frequency component in which the signal level exceeds the pre-determined value can be removed and the occurrence of the over-modulation can be prevented.

Having described a preferred embodiment of the invention with reference to the accompanying drawings, it is to be understood that the invention is not limited to that precise embodiment of the invention and that various changes and modifications could be effected by one skilled in the art without departing from the spirit or scope of the invention as defined in the appended claims.

I claim as my invention:

1. An apparatus for recording a video signal on a videotape, said apparatus comprising:
    a recording circuit;
    a slew rate converter having an input terminal for receiving and converting the slew rate of a video signal fed thereto and an output terminal supplying the slew rate converted video signal to said recording circuit, said video signal as received at said input terminal including a signal component having a high frequency and an amplitude exceeding a predetermined level;
    a detecting circuit receiving said video signal for detecting when said high-frequency signal component of said video signal exceeds a predetermined threshold level and producing a detection output signal; and
    said slew rate converter including control means comprising a current controlled amplifier responsive to said detection output signal for controlling a slew rate of said slew rate converter so as to suppress said signal component in the video signal as supplied to said output terminal and comprising a transistor that controls an amount of the current of said current controlled amplifier and said slew rate converter includes a capacitor that converts the slew rate in response to the current in said current controlled amplifier.

2. The apparatus according to claim 1, in which said detecting circuit comprises a slice circuit having said predetermined threshold level set therein.

3. The apparatus according to claim 2 in which said detecting circuit includes a time delay circuit having a resistor and a capacitor which are connected in parallel for integrating the signal component.

* * * * *